Patented Dec. 31, 1929

1,741,473

UNITED STATES PATENT OFFICE

RICHARD MICHEL, OF UERDINGEN, NIEDERRHEIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF CONDENSATION PRODUCTS

No Drawing. Application filed December 3, 1928, Serial No. 323,574, and in Germany December 8, 1927.

The invention relates to new condensation products from olefines and polynuclear hydrocarbon compounds and to a process of making the same.

As I have set forth in my U. S. Patent No. 1,667,214, issued April 24th, 1928 homologues or condensation products of naphthalene hydrocarbon compounds are obtained by reacting with olefines upon naphthalene hydrocarbon compounds under conditions of elevated temperature and super-atmospheric pressure.

The present invention represents a further development and in accordance therewith I have found that also other polynuclear hydrocarbon compounds than naphthalene hydrocarbon compounds, namely polynuclear hydrocarbon compounds having at least three nuclei such as for example acenaphthene, fluorene, phenanthrene, and the derivatives thereof inasmuch as they contain at least one double linkage in a nucleus (the aromatic nucleus being considered as containing three double linkages) readily react with olefines in the presence of catalytically acting substances to form alkyl derivatives or higher condensation products.

Among the catalytically acting substances which have been found effective in uniting olefines with the said polynuclear hydrocarbon compounds are metallic halides particularly aluminum chloride and iron chloride, and addition compounds of, say, aluminum halides and olefines, with either of these catalysts there may be combined also other substances capable of promoting the reaction such as for example benzene hydrocarbons and halogen acids.

For effecting the condensation of olefines with oxygen-free polynuclear compounds having at least three nuclei it is not necessary to use the former in a very concentrated state; the reaction may be effected with gaseous mixtures containing olefines such as for example the gaseous mixtures resulting from cracking operations, oil gas, and the like. The polynuclear compounds, too, need not be in a pure state; crude materials and technical mixtures as are obtained in distilling coal tar or from the mother liquors of the refining of crude anthracene have proved quite suitable as starting materials.

The conditions of temperature and pressure for carrying out my process may vary within certain limits and depend on the substances to be combined. Generally the higher homologues of ethylene and cyclic olefines such as cyclohexene will more readily react than ethylene. In some cases reaction already takes place at atmospheric pressure but advantageously it is accelerated by application of superatmospheric pressure. The temperature of reaction is found to lie above 50° C. and in particular between 100 and 200° C. the most favorable results are obtained.

The resulting products are alkylated derivatives of the polynuclear compounds or, by more intensified action, higher condensation products thereof. According to the relative proportions of the olefine and polynuclear compounds one or more moles of olefine combine with the polynuclear compound to form oily or crystalline alkylated derivatives or higher condensation products of oily or resinous nature. Those alkyl derivatives wherein some of the alkyl groups contain more than one carbon atom, as well as all the higher condensation products have not been hitherto known.

The invention is illustrated by the following examples but not restricted thereto. The parts are by weight.

Example 1

In an autoclave 500 parts of phenanthrene and 30 parts of anhydrous aluminum chloride are stirred for some 2 hours with propylene gas under a pressure of about 15 atmospheres and at a temperature of from 110 to 130° C. An increase in weight of 270 parts is attained. After cooling and washing with water, the reaction product is distilled under 1 mm. pressure (mercury gauge). There are obtained the following oily fractions increasing in viscosity with the boiling point:

(1) 40 parts of a light yellow oil boiling from 140 to 200° C.

(2) 350 parts of a yellow oil boiling from 200 to 210° C.

(3) 90 parts of a yellow highly viscous oil boiling from 210 to 215° C.

The fractions (2) and (3) are excellent lubricating oils.

A rather brittle resin is left in the still.

*Example 2*

450 parts of acenaphthene and 45 parts of anhydrous aluminum chloride are stirred with propylene gas under a pressure of about 12 atmospheres and at a temperature of from 100 to 120° C. As soon as reaction has begun, further heating is not necessary since the temperature is maintained due to the reaction heat generated. After 310 parts of propylene have been absorbed, no further reaction takes place. The liquid reaction product is washed with water and by distilling it under 1 mm. pressure (mercury gauge) separated into an oily fraction boiling from 150 to 200° C. and a second fraction boiling from 200 to 210 C. which solidifies after some time to a crystalline mass.

*Example 3*

500 parts of crude anthracene (43 per cent) and 50 parts of anhydrous aluminum chloride are stirred with propylene gas under a pressure of about 20 atmospheres and at a temperature of about 120° C., until an increase in weight of 200 parts is attained. After washing with water a soft resinous body remains.

In the following claims the generic term "polynuclear hydrocarbon compound" is used to denote a polynuclear aromatic hydrocarbon, its homologues and halogenated and/or partially hydrogenated derivatives thereof.

I claim:

1. Process which comprises reacting with an olefine upon a polynuclear hydrocarbon compound having at least three nuclei in the presence of a catalytically acting metallic halide.

2. Process which comprises reacting with an olefine upon a polynuclear hydrocarbon compound having at least three nuclei in the presence of a catalytically acting metallic halide under conditions of elevated temperature over 50° C. and superatmospheric pressure.

3. Process which comprises reacting with an olefine upon a polynuclear aromatic hydrocarbon having at least three nuclei in the presence of a catalytically acting metallic chloride, under superatmospheric pressure and at a temperature of about 100° C.

4. Process which comprises reacting with propylene upon phenanthrene in the presence of aluminum chloride under a pressure of from 10 to 20 atmospheres and at a temperature of from about 100° to 150° C.

5. Process which comprises reacting with an olefinic gas upon a polynuclear hydrocarbon compound having at least three nuclei in the presence of a catalytically acting metallic halide.

In testimony whereof I have hereunto set my hand.

RICHARD MICHEL.